(12) United States Patent
Capp

(10) Patent No.: US 7,025,406 B2
(45) Date of Patent: Apr. 11, 2006

(54) VEHICLE ROOF-MOUNTED SLEEPING BERTHS

(75) Inventor: Nicholas Peter Capp, Luton (GB)

(73) Assignee: Nicholas Capp, Luton (GB)

( * ) Notice: Subject to any disclaimer, the term of this patent is extended or adjusted under 35 U.S.C. 154(b) by 72 days.

(21) Appl. No.: 10/851,406

(22) Filed: May 24, 2004

(65) Prior Publication Data

US 2005/0006926 A1    Jan. 13, 2005

(51) Int. Cl.
*B60P 3/39* (2006.01)

(52) U.S. Cl. .................................... 296/176; 296/26.09

(58) Field of Classification Search ........ 296/156–176, 296/24.3, 26.08, 26.09, 37.1, 37.7
See application file for complete search history.

(56) References Cited

U.S. PATENT DOCUMENTS

| | | | | |
|---|---|---|---|---|
| 2,561,168 A | * | 7/1951 | Beckley | ...................... 52/66 |
| 3,359,693 A | * | 12/1967 | Mitas | .............................. 52/64 |
| 3,575,460 A | * | 4/1971 | Kennedy | ...................... 296/160 |
| 4,220,370 A | * | 9/1980 | Rice | ............................ 296/139 |
| 4,223,689 A | * | 9/1980 | Cox | ............................ 135/139 |
| 4,279,440 A | * | 7/1981 | Golding, Sr. | ................ 296/164 |

* cited by examiner

*Primary Examiner*—H. Gutman

(57) ABSTRACT

A sleeping berth unit comprises at least two shape-retaining sub-modules shaped so that those sub-modules can interconnect in a sliding manner. The unit is mounted on the roof of a vehicle, at least one sub-module being fixed to the vehicle, leaving at least one sub-module free to slide back and forth. The unit is compressed into transit mode, or expanded into accommodation mode, with a single sliding action. The unit is accessed through a door at the end of at least one sub-module, via an extendable ladder. The ladder locates securely to the access door sub-module, and, if required, acts as a stabiliser for the unit. The sleeping berth unit access door sub-module(s) can be replaced with blanking module(s) to create a storage unit.

3 Claims, 3 Drawing Sheets

VEHICLE ROOF-MOUNTED SLEEPING BERTHS

BACKGROUND OF THE INVENTION

This invention relates to a vehicle roof-mounted sleeping berth unit.

Motorhomes are specialist vehicles that provide, as a key feature, mobile sleeping accommodation. Motorhomes are considerably more expensive than standard passenger vehicles, however, and for much of the time their special features are not utilised.

BRIEF SUMMARY OF THE INVENTION

According to the present invention there is provided a sleeping berth unit that is mounted on the roof of any sufficiently large vehicle. The unit comprises at least two shape-retaining sub-modules shaped so that those sub-modules can interconnect in a sliding manner. At least one sub-module is fixed to the vehicle, leaving at least one sub-module free to slide back and forth. The unit is compressed, or expanded, with a single sliding action. The unit is accessed through a door at the end of one sub-module, via an extendable ladder.

The unit provides a means of adding sleeping accommodation to a standard vehicle that is inexpensive in comparison to the cost of a specialist motorhome.

The unit is simple to use because it becomes operational with a single sliding action.

DETAILED DESCRIPTION OF THE INVENTION

A specific embodiment of the invention will now be described in detail, with reference to the accompanying drawings.

The sleeping berth unit comprises a taller half-module 2 and a less tall half-module 1, shaped so that the taller half-module can locate inside the less tall half-module. The unit is mounted on the roof of a vehicle utilising a standard roof rack, the less tall half-module being secured to the vehicle leaving the taller half-module free to slide back and forth. The unit is compressed into transit mode, or expanded into accommodation mode, with a single sliding action. A means is provided for securing the unit in both compressed transit mode and expanded accommodation mode, for example a bolt, catch, or similar means (not shown).

The unit is constructed from shape-retaining weather-resistant materials, such as fiberglass.

Figure 1:
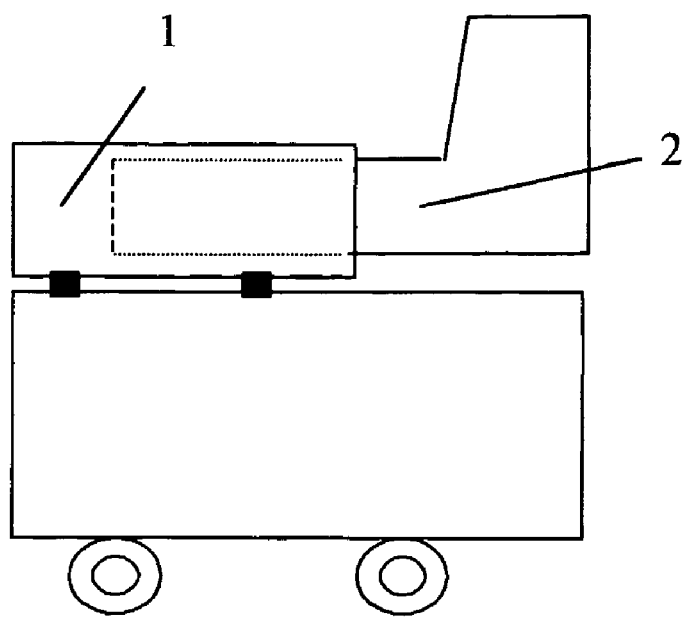
FIG. 1 shows the side view of the sleeping berth unit in compressed mode.

In order to ready the unit for transit, the taller half-module is pushed into the less tall half-module as shown in FIG. 1 until it reaches travel stops (not shown), and is secured in position using the aforementioned means provided.

Figure 2:
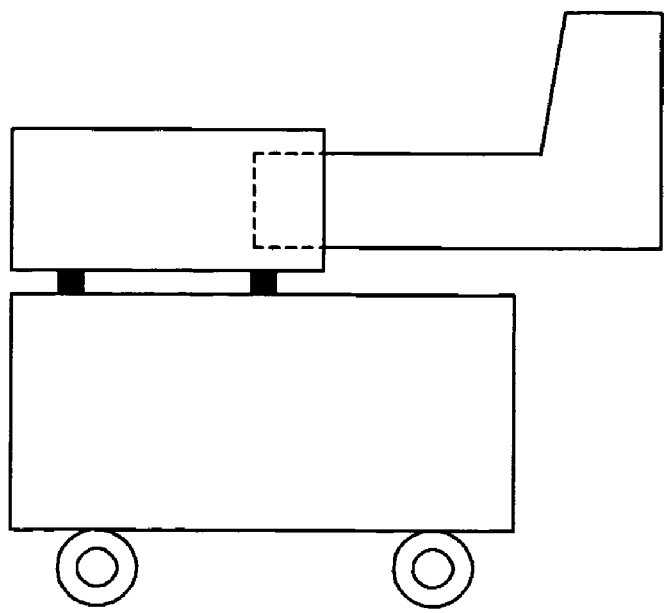
FIG. 2 shows the side view of the sleeping berth unit in expanded mode.
Figure 3:
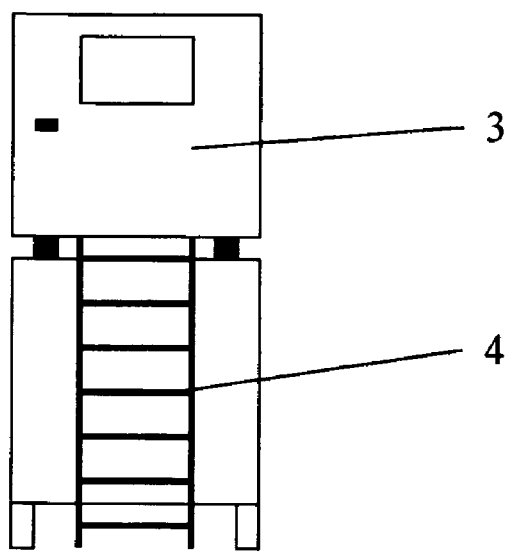
FIG. 3 shows the end view of the sleeping berth unit, with the access ladder deployed to reach the access door.
Figure 4:
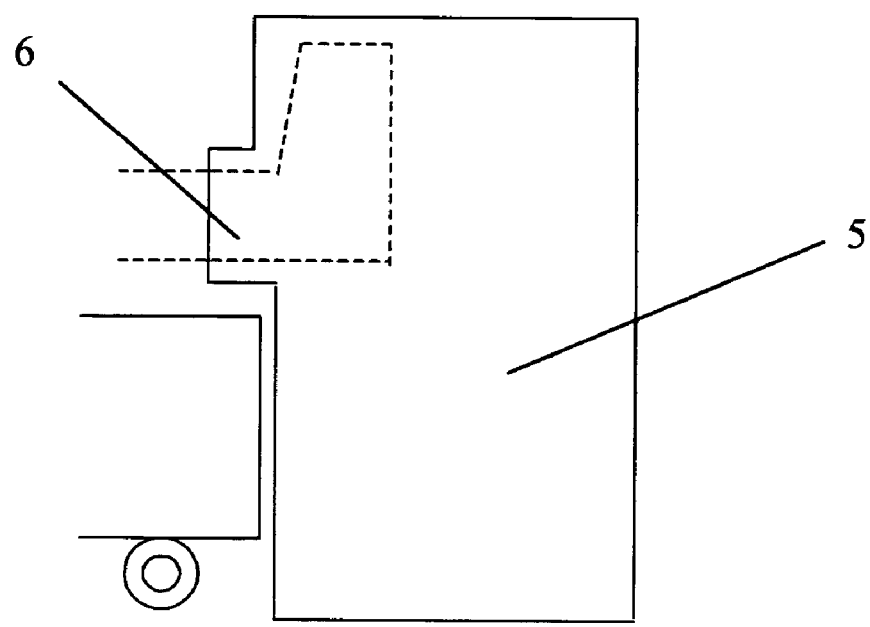
FIG. 4 shows the side view of the sleeping berth unit with the awning attached.
Figure 5:
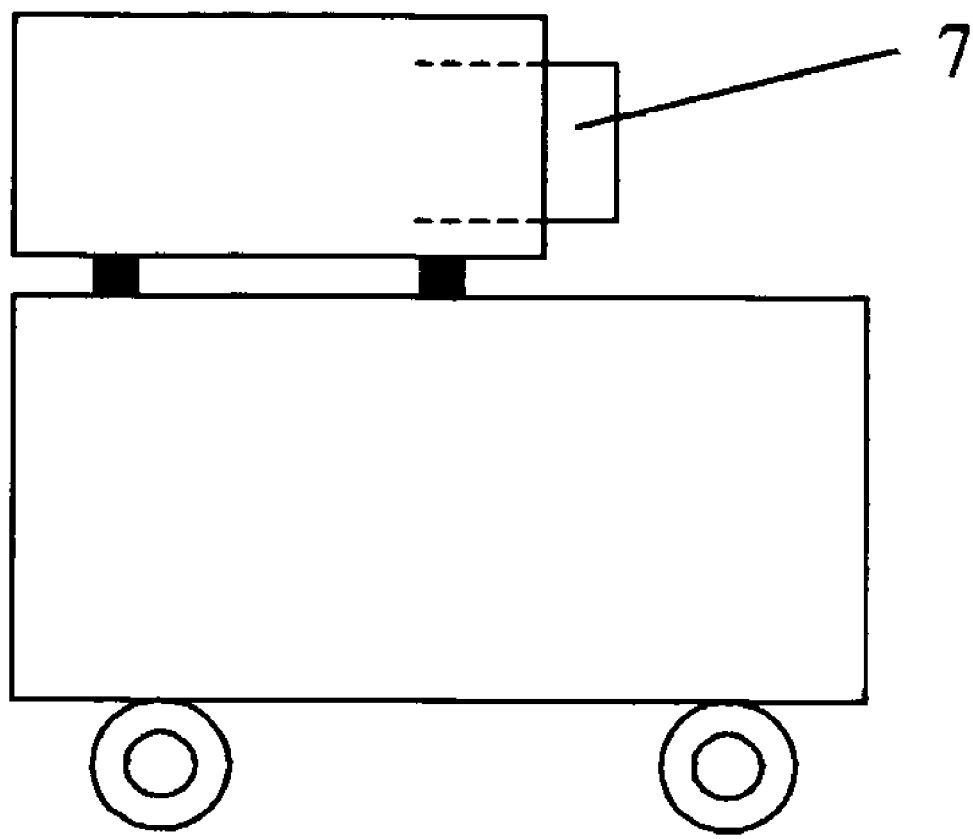
FIG. 5 shows the side view of the sleeping berth unit with the access door sub-module replaced with the blanking sub-module.

In order to ready the unit for accommodation purposes, the taller half-module is withdrawn from the less tall half-module as shown in FIG. 2 until it reaches travel stops (not shown), and is secured in position using the aforementioned means provided.

An access door 3 is provided at the end of the taller half-module. The access door incorporates a ventilation window that can be opened and closed from inside the unit.

An extendable ladder 4 is provided that locates securely to the taller half-module, via lugs in the underside of the taller half-module (not shown). The height of the ladder is adjusted to suit the height of the securing lugs.

The unit is accessed through the door at the end of the taller half-module, via the extendable ladder. The entry ladder also acts as a stabiliser.

The unit is supplied with a purpose-made awning 5 incorporating a snorkel-type fitting 6 to connect to the taller half-module. The awning is height adjustable, and weighted to hold it in position.

The less tall half-module incorporates a lid (not shown), to allow the unit to be easily used for storage purposes.

The unit is supplied with a spare blanking half-module 7, to replace the taller half-module when the unit is purely being used for storage purposes.

What I claim as my invention is:

1. A sleeping berth unit comprising a taller half-module and a less tall half-module, shaped so that the taller half-module locates inside the less tall half-module, both half-modules being made entirely of shape-retaining material, the less tall half-module being fixed to the roof of a host vehicle, leaving the taller half-module free to slide back and forth within the less tall half-module, the unit being compressed into transit mode or expanded into accommodation mode in one sliding operation, the unit being accessed through a door in the end of its taller half-module via an entry ladder.

2. A sleeping berth unit, as claimed in claim 1, where the entry ladder acts as a stabilizer.

3. A sleeping berth unit, as claimed in claim 1, where the access door sub-module can be replaced with a blanking sub-module to create a storage unit.

* * * * *